United States Patent [19]
Ewoldt

[11] 3,765,039
[45] Oct. 16, 1973

[54] SEAT COVER
[75] Inventor: Robert Ewoldt, Lincoln, Nebr.
[73] Assignee: Outboard Marine Corporation, Waukegan, Ill.
[22] Filed: July 29, 1971
[21] Appl. No.: 167,201

[52] U.S. Cl. .............................. 5/353.1, 297/219
[51] Int. Cl. ............................................ A47c 31/10
[58] Field of Search .................... 297/218, 219, 226; 5/353.1, 353.7, 353.3, 335, 354

[56] References Cited
UNITED STATES PATENTS
| | | | |
|---|---|---|---|
| 2,178,412 | 10/1939 | Vallone | 5/353.1 |
| 2,322,836 | 6/1943 | Eady | 5/353.1 |
| 1,548,621 | 8/1925 | London | 5/354 X |
| 1,175,314 | 3/1916 | Sisbower | 5/354 |
| 1,295,662 | 2/1919 | Witham | 297/226 |

Primary Examiner—Francis K. Zugel
Attorney—Robert E. Clemency et al.

[57] ABSTRACT

Disclosed herein is a seat assembly comprising a seat cover extending in covering relation to a seat cushion supported on a seat frame including portions with apertures therein. The seat cover includes hem portions extending beyond the cushion into overlying relation to the apertured frame portions and defining spaced hem pockets. Associated with the hem portions are respective straps which extend through the hem pockets. Extending from the straps in the area between the spaced hem pockets are releasable fasteners projecting into the apertures in the frame portions to releasably connect the cover to the frame.

1 Claim, 2 Drawing Figures

Patented Oct. 16, 1973

3,765,039

SEAT COVER

BACKGROUND OF THE INVENTION

The invention relates generally to seat covers and more particularly to arrangements for releasably attaching seat covers to a seat supporting frame so as to releasably hold the seat cover in proper position while, at the same time, to provide for removal, replacement and repair.

SUMMARY OF THE INVENTION

The invention provides a seat cover assembly which reliably retains a seat cover in assembled relation to a supporting seat frame while, nevertheless, affording disconnection of the seat cover for repair or replacement.

In accordance with the invention, a plurality of fasteners extend from straps received in the hem pockets of a cover for releasable connection to a supporting frame. In the particularly disclosed embodiment, the fasteners comprise snap fasteners, i.e., are fasteners which are insertable in cooperating apertures in the supporting frame and which include portions which resiliently interfere with both insertion and withdrawal of the fasteners relative to the apertures in the supporting frame.

One of the principal objects of the invention is the provision of a seat cover assembly which affords reliable releasable connection and disconnection of a seat cover to a supporting frame, which connection and disconnection can be accomplished with a minimum of effort.

Another of the principal objects of the invention is the provision of a seat cover which is releasably connected to a seat frame and which is durable, light in weight and easy to replace and repair.

Still another object of the invention is the provision of a seat cover assembly which is easy to manufacture and assemble on a seat and which will provide a long and useful life.

Other objects and advantages of the invention will become known by reference to the following description and accompanying drawings.

DRAWINGS

Figure 1:
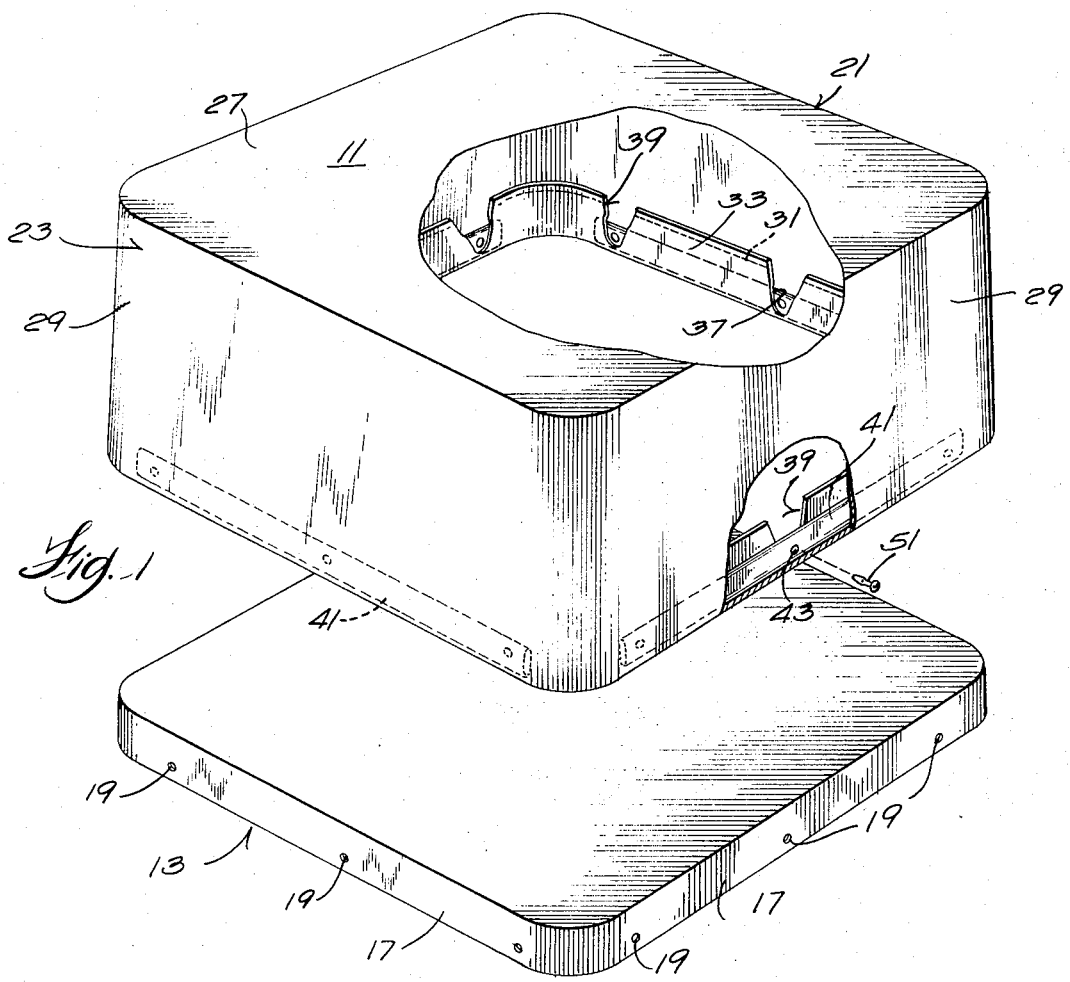
FIG. 1 is an expanded view, with parts broken away, illustrating various of the components of a seat assembly embodying various of the features of the invention.

Before explaining the invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

DETAILED DESCRIPTION

Illustrated in the drawings is one embodiment of a seat assembly 11 in accordance with the invention. The seat assembly 11 includes a supporting frame 13 which can be conventionally constructed of metal or other similar rigid material, such as plastic or wood, and which includes portions 17 including a plurality of apertures 19. In the specifically illustrated construction, the portions 17 extend vertically at the periphery of the frame 13.

Supported on top of the frame 13 is a seat cushion 21 which can be constructed in a conventional manner of cellular or other material. The details of the construction of the seat cushion are not a part of the disclosed invention.

Extending in covering relation to the cushion 21 is a cover 23 which can be fabricated of cloth, plastic, wood of other similar material and which includes a top portion 27, and four side portions 29 connected to the top portion 27 and serially connected to each other so as to fit over the seat cushion 23 and to extend downwardly into overlying relation to the vertical portions 17 of the supporting frame 13.

In accordance with the invention, the lower margin of the seat cover 23 is fabricated so as to facilitate releasable connection with the frame 13 and, preferably, to provide such connection in cooperation with the apertures 19 in the frame 13. More specifically, the seat cover 23 carries, as will be described, one or more straps or bars which are connectable to the frame 13 by fasteners still to be described.

Figure 2:
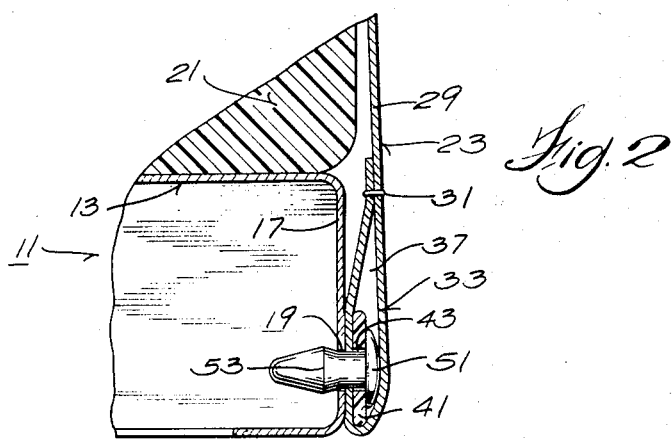
FIG. 2 is a fragmentary view, partially in section, with the components of the seat assembly illustrated in FIG. 1 in assembled relation.

While other specific constructions can be employed within the spirit of the invention, in the disclosed construction, the cover material is folded inwardly and upwardly to provide an inturned part and connected, as for example, by stitching 31 (See FIG. 2) or otherwise to the main part of the cover side portions 27 to provide a series of hems 33 defining along the lower margins, of each of the cover side portions 29, a series of two or more spaced pockets or sleeves 37. In this regard, the upwardly folded material or inturned part is desirably notched as shown at 39 (See FIG. 1) so as to avoid interference with the fastening means still to be described.

In order to facilitate connection of the seat cover 23 to the frame 13, a series of bars or straps 41 of relatively rigid material, such as metal, wood or plastic, are received in the spaced pockets 37 along each side portion 29 of the cover 23. Each of the bars 41 is apertured, as shown at 43, in a pattern corresponding to the apertures 19 in the vertical frame portions 17.

Also in accordance with the invention, the cover 23 is secured to the frame 13 by releasable fastener means. While various fasteners can be employed, in the preferred illustrated construction, the fastening means comprises fasteners 51 which extend through the apertures 43 in the bars 41 and through the apertures 19 in the vertical frame portions 17 to retain the seat assebmly 11 in assembled relation. In the preferred disclosed construction, the fasteners 51 comprise resilient snap fasteners including portions 53 which are resiliently biased to positions interfering with insertion and withdrawal of the fasteners 51 with the apertures 19 and 43, while affording, assembly and disassembly upon the application of sufficient axial force. Such fasteners 51 are well known and their detailed construction will not be further described.

In assembly of the seat 11, the fasteners 51 are first inserted in the apertures or holes 43 in the straps or bars 41 and then the straps 41 are inserted in the hem pockets 37. The cushion 21 is then placed on the top of the frame 13 and the seat cover 23 placed over the cushion 21 with the lower margins of the side portions 29 extending into overlying relation to the vertical portions 17 of the frame 13 and with the fasteners 51 extending in alignment with the apertures 19 in the vertical frame portions 17. The fasteners 51 can then be pushed into the apertures 19 to complete assembly of the seat 11.

When it is desired to remove the seat cover 23 for repair or replacement or otherwise, the fasteners 51 can be removed from engagement with the vertical frame portions 17 by applying a pointed or chisel-shaped instrument, such as a screw driver, between the vertical frame portions 17 and the straps 41 to cause separation therebetween and disconnection of the fasteners 51 from the vertical frame portions 17. Upon such disconnection, the cover 23 can be readily removed and subsequently replaced.

Fasteners other than the snap fasteners disclosed herein can be employed to releasably connect the straps or bars 41 to the frame 13. In addition, if desired, the frame apertures 19 can be located other than as shown. For instance, such apertures could be formed in horizontally extending flanges and the cover construction could be suitably modified to permit location of the hems in overlying relation to the apertured horizontal portions of the frame.

Various of the features of the invention are set forth in the following claims.

I claim:

1. A seat assembly comprising a seat frame having vertical portions with apertures therein, a seat cushion located on said seat frame, a seat cover extending in covering relation to said seat cushion and including side portions extending beyond said cushion into overlying relation to said vertical frame portions, each of said side portions having lower integral hem portions with an outer continuously extending ply and an inturned ply including spaced sections defining, with said outer ply, laterally spaced hem pockets extending into overlying relation to said vertical frame portions, respective straps associated with each of said cover side portions and extending through at least two of said laterally spaced hem pockets and including apertures in the areas between said hem pockets in alignment with the apertures in said frame portions, and fasteners extending inwardly relative to said frame through said apertures in said straps and into said apertures in said frame portions to releasably connect said cover to said frame, said fasteners being exteriorly covered by said outer ply and including, at one end thereof, a headed portion, and at the other end thereof, resilient portions permitting assembly of said fasteners to said straps and, when said straps with said fasteners assembled thereto are located in said hem pockets, to then permit assembly and disassembly of said fasteners relative to said frame.

* * * * *